United States Patent

Matsuura et al.

Patent Number: 5,162,443
Date of Patent: Nov. 10, 1992

[54] PROCESS FOR PRODUCING GRANULAR PROPYLENE POLYMERS ENDOWED WITH IMPROVED FLOWING CHARACTERISTICS

[75] Inventors: Mitsuyuki Matsuura; Takashi Fujita, both of Yokkaichi, Japan

[73] Assignee: Mitsubishi Petrochemical Company Limited, Tokyo, Japan

[21] Appl. No.: 840,590

[22] Filed: Feb. 26, 1992

Related U.S. Application Data

[63] Continuation of Ser. No. 417,036, Oct. 4, 1989, abandoned.

Foreign Application Priority Data

Oct. 5, 1988 [JP] Japan ............................... 63-251474

[51] Int. Cl.$^5$ .......................................... C08F 297/08
[52] U.S. Cl. ..................................... 525/247; 525/268; 525/322; 525/323; 525/324
[58] Field of Search ............... 525/247, 268, 322, 323, 525/324; 526/119

[56] References Cited

U.S. PATENT DOCUMENTS 3,530,107  9/1970  Yoshioka et al.
4,483,966  11/1984  Suzuki et al.
4,547,552  10/1985  Toyota et al. ...................... 525/254
4,820,775  4/1989  Shiga et al. .......................... 525/249

FOREIGN PATENT DOCUMENTS 0202946  11/1986  European Pat. Off.

Primary Examiner—Joseph L. Schofer
Assistant Examiner—R. H. Delmendo
Attorney, Agent, or Firm—Oblon, Spivak, McClelland, Maier & Neustadt

[57] ABSTRACT

In a process for producing granular propylene block copolymers by Ziegler-Natta polymerization of an α-olefin wherein the Ziegler-Natta catalyst comprises a granular solid transition metal catalyst component and an organometal component in two steps wherein a resinous homopolymer of propylene is produced in the first step and an elastomeric copolymer of propylene with ethylene is produced in the second step, the improvement which comprises the use as the granular solid transition metal component of a mixture of the solid transition metal components, one made up substantially of particles of particle size of more than 5 microns and the other made up substantially of particles of particle size of 1 to 5 microns thereby to produce granular propylene copolymers endowed with an improved granulometric properties such as lowered tackiness and thus improved flowing characteristics. The component (B) is preferably produced from the particles for the component (A) by reducing the particle size of its particles.

19 Claims, No Drawings

PROCESS FOR PRODUCING GRANULAR PROPYLENE POLYMERS ENDOWED WITH IMPROVED FLOWING CHARACTERISTICS

This application is Continuation of application Ser. No. 07/417,036, filed on Oct. 4, 1989, now abandoned.

BACKGROUND OF THE INVENTION

Field of the Art

The present invention relates to technology for improving granulometric property, i.e. flowing characteristic, of granular propylene copolymers which are called propylene block copolymers.

Recently, it has become popular to produce propylene block copolymers comprising a resinous segment of polypropylene and an elastomeric segment of an ethylenepropylene copolymer by gas-phase polymerization, and the use of such block copolymers has been increased in automobile industries for manufacturing, in particular, bumpers, inner panels, outer sheeting and the like.

Such block copolymers may, however, have some drawbacks such that higher the content of elastomeric block is, increased will be the stickiness of polymer particles resulting in poor flowing characteristics whereby commercial value of product will be reduced and a problem will be posed upon transportation and storage of the product polymer.

Increase in the stickiness of polymer particles will invite adherence of polymer in a polymerization vessel whereby stable polymerization operation will often be impaired.

SUMMARY OF THE INVENTION

It is an object of the present invention to solve the above problems, wherein the object is attained in accordance with the present invention by using a transition metal component of a Ziegler-Natta type catalyst of a specified particle size distribution in the process of production of propylene block copolymers of the nature given above.

Accordingly, there is provided in accordance with the present invention a process for producing granular propylene copolymers comprises: a first polymerization step wherein propylene as such or in admixture with ethylene is subjected to polymerization in one or more steps in the substantial absence of an inert solvent wherein use is made of a Ziegler-Natta type catalyst comprising a solid transition metal catalyst component and an organometal component thereby to produce a granular propylene homopolymer or copolymer with ethylene of an ethylene content of no higher than 7% by weight; and a second polymerization step wherein ethylene as such or in admixture with propylene is subjected to polymerization, in the presence of a product of the first polymerization step, in one or more steps in the substantial absence of an inert solvent thereby to produce an elastomeric polymer of ethylene, the solid transition metal component being a mixture of:

component (A) which is a solid catalyst component comprising titanium, magnesium and a halogen as essential elements and having granulometric characteristics such that a content of particles of a maximum dimension of no larger than 5 microns is no higher than 0.1% by weight; and component (B) which is a solid catalyst component comprising titanium, magnesium and a halogen as essential elements and having a granulometric characteristics such that its average particle size is within the range of 1 to 5 microns.

According to the present invention, stickiness of propylene block copolymers and, in turn, flowing characteristics of the polymer particles are successfully improved. As the result, process stability in polymerization and in transportation and storage of polymers are improved leading to not a few improvement in productivity.

DETAILED DESCRIPTION OF THE PREFERRED EMBODIMENTS

Production of the propylene copolymers

The propylene copolymers to which the present invention is applied, namely what is called "propylene block copolymers" are well known in the art as to the products per se and thus their production.

Accordingly, the propylene copolymers to be used in the practice of present invention are produced by any suitable process or method known in the art.

Catalyst

The catalysts for the practice of the present invention are Ziegler-Natta catalysts which comprise a solid transition metal component and an organometal component wherein the solid transition metal component comprises titanium, magnesium and a halogen as essnetial elements. The expression "comprises titanium, magnesium and a halogen as essential elements" means that the solid transition metal component can contain further any suitable component and thus include those in which an electron donor is used as what is called "inside donor".

The Ziegler-Natta type catalysts comprise a solid transition metal component and an organometal component, and can thus contain further any suitable component and thus include those in which an electron donor is used as what is called "outside donor".

Examples of such catalysts include those disclosed in Japanese Patent Laid-Open Publication Nos. 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984, 149906/1984, 211312/1986, 197607/1986, 204202/1986, 187707/1987, 187706/1987, 246906/1987, 39901/1988, 257906/1987, 20507/1987, 287906/1986, and 266413/1986, and U.S. Pat. Nos. 4,617,284; 4,703,026; 4,780,443; 4,814,314 and 4,822,763.

Preferable solid transition metal catalyst components are those produced as shown in U.S. Pat. Nos. 4,617,284; 4,703,026; 4,780,443 and 4,822,763, and preferable are products of contact of a component (I) and a component (II) or contact of a component (I), a component (II) and a component (III) given hereinbelow.

The component (I) can be prepared according to following method wherein a magnesium halide is contacted with a titanium tetra-alkoxide and a polymeric silicon compound represented by the following formula:

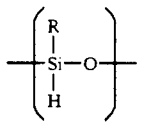

wherein R stands for a hydrocarbyl group having 1 to 10 carbon atoms, preferably 1 to 6 carbon atoms, and n is a degree of polymerization, which is preferably such that the polymer has a viscosity of 0.1 to 100 centistokes (cSt), and the obtained solid component is contacted with (i) a halogen-containing titanium compound and/or a silicon halide or with (ii) silicon halide and phosphorus chloride or with (iii) silicon halide and tungsten halide, if necessary to together with an electron donor.

The component (II) to be contacted with the above-mentioned component (I) for preparing the solid catalyst component of the present invention is a silicon compound represented by the following formula:

$$R^1R^2{}_{3-n}Si(OR^3)_n$$

wherein $R^1$ stands for a branched hydrocarbyl group, $R^2$ stands for a hydrocarbyl group, which may be the same as or different from $R^1$, $R^3$ stands for a hydrocarbyl group, and n is a number of from 1 to 3.

It is preferred that $R^1$ be branched from the carbon atom adjacent to the silicon atom, and in this case, it is preferred that the branch group be an alkyl group, a cycloalkyl group, or an aryl group such as, for example, a phenyl group or a methyl-substituted phenyl group. Furthermore, it is preferred that in $R^1$, the carbon atom adjacent to the silicon atom, that is, the carbon atom at the α-position, be a secondary or tertiary carbon atom. It is especially preferred that the carbon atom bonded to the silicon atom is a tertiary carbon atom. The $R^1$ is ordinarily of 3 to 20 carbon atoms, preferably 4 to 10 carbon atoms. Generally, $R^2$ is a branched or linear aliphatic hydrocarbyl group having 1 to 20 carbon atoms, preferably 1 to 10 carbon atoms. $R^3$ is ordinarily an aliphatic hydrocarbyl group, preferably a linear aliphatic hydrocarbyl group having 1 to 4 carbon atoms.

Component (III) is an organoaluminum compound represented by the following general formula:

$$R_{3-n}AlX_n$$

wherein R stands for a hydrocarbyl residue having 1 to about 20 carbon atoms, X stands for a halogen atom, and n is a number of $0 \leq n < 3$.

Catalyst (bis)

The Ziegler-Natta type catalysts used in the present invention are characterized by the use as the solid transition metal component of a mixture of two components, i.e. component (A) and component (B), which are differentiated by their granulometric characteristics in particle sizes.

The component (A) has granulometric characteristics such that a content of particles of a maximum dimension of 5 microns or smaller is 0.1% by weight or lower. The expression "maximum dimension" herein means the largest size in any dimensional direction of a given particle. It is preferred in the present invention that the particles are spherical and such spherical particles of a solid transition metal catalyst component can be prepared by, for example, a method disclosed in Japanese Patent Laid-Open Publication No. 187707/1987 and U.S. Pat. No. 4,780,443 referred hereinabove, and the maximum dimension of such spherical particles is of course the diameter. When the particle is in an elongated shape, its length is the maximum dimension.

The component (A) contains particles of such a small particle size in such a small quantity as 0.1% by weight or lower, preferably 0.01% by weight or lower. Except for this characteristic that the component (A) is substantially free from such small or fine particles, the component (A) may be characterized by its average particle size of 7 to 100 microns, preferably 10 to 50 microns.

The component (A) may be prepared by any appropriate method with or without what is called "preliminary polymerization" included. "Preliminary polymerization" is polymerization which a solid catalyst component undergoes as a kind of its processing before it is subjected to what is called "principal" polymerization, and means polymerization of a monomer which, in preparing the component (A), is preferably one producing a crystalline polymer such as ethylene, propylene or 4-methyl-pentene-1, in such a small quantity as 0.001–1000 g-polymer/g-component (A), conducted upon contact with the component (A) or its precursor, i.e. a solid catalyst component to form the component (A), in the presence or absence of an organometal component in any mode of polymerization as shown in the related art given hereinbefore, followed where necessary by sieving of the polymer product to remove fine particles of particle size of 5 microns or smaller. Preferably, the component (A) is prepared by a method wherein a solid catalyst component which has not undergone the preliminary polymerization is subjected where necessary to sieving to remove the fine particles.

The component (B), on the other hand, is essentially the same as the component (A) but is differentiated from the component (A) in that an average particle size of the particles of the component (B) is 1 to 5 microns, preferably 2 to 4 microns. Preferably, the component (B) has a content of particles of the maximum dimension of 5 microns or smaller in a quantity of approximately 60 to 95% by weight. While the component (B) is the same as the component (A) except for its granulometric characteristics, the component (B) can be differentiated from the component (A), when so desired, with respect to the essential elements of titanium, magnesium and a halogen and optional elements used upon necessity such as an electron donor in their types, quantities and the way how they are used.

The component (B) is characterized by the fact that it is of particles smaller than the component (A), and such smaller particles may preferably be prepared by crushing of particles of the component (A) or by recovering such smaller particles from particles which have undergone preliminary polymerization to prepare the component (A). Accordingly, the solid transition metal catalyst component in accordance with the present invention may preferably comprise the component (A) which is a solid catalyst component prepared without having undergone preliminary polymerization and processed so that the content of the fine particles is 0.1% by weight or lower and the component (B) which is prepared from the particles for the component (A) by crushing the particles or by subjecting the particles to preliminary polymerization thereby to reduce the average particle size. The preliminary polymerization here may preferably be performed with mono- or di-olefin of e.g. 4 to 10 carbon atoms which will produce a non-crystalline or amorphous polymer.

The component (B) is used in a quantity of 0.1 to 20% by weight, preferably 1 to 10% by weight, of the component (A).

The maximum size of particles is determined by a known wet sieving method wherein standard sieves under JIS Z 8801 is used or light transmission-sedimentation method wherein an apparatus "MICRON PHOTOCIZER SKN-1000" manufactured by Seishi Kabushiki Kaisha, Japan is used; and the average particle size is determined by the light transmission-sedimentation method. For particulars of the light transmission-sedimentation method, reference may be made to "CHEMICAL ENGINEERING HANDBOOK", Revised 5th Ed, pp 226-228, Maruzen (1988), edited by Japanese Society of Chemical Engineering.

Polymerization process

The propylene copolymers for the practice of the present invention is produced by a process comprising two steps of:

a first polymerization step wherein propylene as such or in admixture with ethylene is subjected to polymerization in one or more steps in the substantial absence of an inert solvent thereby to produce a granular propylene homopolymer or copolymer with ethylene of an ethylene content of no higher than 7% by weight, preferably of no higher than 2% by weight, preferably propylene homopolymer; and a second polymerization step wherein ethylene as such or in admixture with propylene is subjected to polymerization, in the presence of a product of the first polymerization step, in one or more steps in the substantial absence of an inert solvent thereby to produce an elastomeric polymer of ethylene.

It is to be understood that the expression "in the presence of a product of the first polymerization step" means that the catalyst activity used in the first polymerization step is retained at least partly, and includes the situation such that not only all but also a part of the process product of the first polymerization step is brought to the second step polymerization step and that an organometal compound which may be regarded as a co-catalyst to a solid catalyst component of a Ziegler type catalyst or an electron donor compound as what is called "outside donor" is introduced or supplemented thereto.

The first polymerization step may be performed at a temperature such as e.g. 50° to 100° C., preferably 60° to 90° C., and under a pressure of such as e.g. 1 to 50 kg/cm²G It may be preferable in the first polymerization step to use a molecular weight controlling agent such as hydrogen gas to obtain a polymer such that its MFR is regulated so that the final propylene copolymer endowed with a higher melt flow rate, MFR, such as to will be obtained after the practice of the second polymerization step.

The second polymerization step may be performed so that ethylene or a mixture of propylene with ethylene is further introduced into the polymerization to polymerize it in one or more steps thereby to produce an ethylene homopolymer or a propylene-ethylene copolymer of an ethylene content of 20 to 100% by weight, preferably 30 to 100% by weight, more preferably 75 to 95% by weight, in a quantity of 5 to 70% by weight, preferably 10 to 50% by weight, of the final propylene copolymer produced.

The second polymerization step can be modified so that a comonomer other than ethylene in a smaller quantity than ethylene is used in addition to ethylene. Such comonomers are, for example, α-olefins such as 1-butene, 1-pentene, 1-hexene, and 4-methyl-pentene-1.

Use of such comonomer is permissible also in the first polymerization step and the first polymerization step is to be so construed, but the advantage due to the use of such comonomers may not be prominent.

The second polymerization step may be performed at a temperature such as e.g. 50° to 100° C., preferably 60° to 90° C. under a pressure such as e.g. 1 to 50 kg/cm²G.

A molecular controlling agent can be used also in the second polymerization step, but the use may sometimes be omitted.

Production of propylene copolymers in two steps in accordance with the present invention is carried out in any mode of operation for each of the steps such as batch-wise, continuous or semi-batchwise operation.

The present invention is concerned with production of granular propylene copolymers endowed with improved flowing characteristics, and may thus be carried out typically by gas-phase polymerization. The gas-phase polymerization, namely polymerization in a gaseous monomer in the absence of an inert solvent, is carried out in any mode of operation in respect of the contact of polymer particles having catalytic active sites with a gaseous monomer. Typically, gas-phase polymerization is conducted so that polymer particles are fluidized in a gas-phase to form a fluidized bed, or so that polymer particles are recycled in a gas phase comprising mainly a gaseous monomer. The polymer produced is usually in the form of particles of an average diameter of 100 to 2,000 microns, preferably 300 to 1,000 microns, and such granular polymer is preferable, too.

EXAMPLES

EXAMPLE 1

(a) Production of the solid catalyst component (A)

Into a flask thoroughly replaced in it with nitrogen was introduced 200 ml of dehydrated and deoxygenated n-heptane, and subsequently 0.4 mol of $MgCl_2$ and 0.8 mol of $Ti(O-nC_4H_9)_4$ and the reaction was carried at 95° C. for 2 hours. After completion of the reaction, the temperature was lowered to 40° C., followed by addition of 48 ml of methylhydropolysiloxane (of 20 centistokes) and the reaction was carried out for 3 hours. The solid component formed was washed with n-heptane.

Subsequently into a flask thoroughly replaced in it with nitrogen was introduced 50 ml of n-heptane purified similarly as described above, and the solid component prepared above was introduced in an amount of 0.24 mol as calculated on Mg atom. Then, a mixture of 25 ml of n-heptane with 0.4 mol of $SiCl_4$ was introduced into the flask at 30° C. over 30 minutes, and the reaction was carried out at 70° C. for 3 hours. After completion of the reaction, the product was washed with n-heptane. A mixture of 25 ml of n-heptane with 0.024 mole of phthalic chloride was introduced to the flask at 70° C. over 30 minutes, and reacted at 90° C. for 1 hour.

After the reaction, the product was washed with n-heptane, followed by addition of 20 ml of $SiCl_4$, and the reaction was conducted at 80° C. for 6 hours. After the reaction the product was washed amply with n-heptane. The product was found to have a Ti-content of 1.21% by weight.

Into a flask amply replaced in it with nitrogen was introduced 50 ml of amply purified n-heptane, and then 5 g of the solid component obtained above was introduced. Next, 1.6 ml of $(CH_3)_3CSi(CH_3)(OCH_3)_2$, 1.2 ml of $SiCl_4$, and further 3.0 g of triethylaluminum were respectively introduced and contacted at 30° C. for 2 hours. After completion of the contact, the product was amply washed with n-heptane to provide the solid component (A). The content in the component (A) of particles of the maximum particle size no higher than 5 microns was no higher than 0.1% by weight and the average particle size was of the component (A) was 11.4 microns.

(b) Production of the solid component (B)

Into a flask amply replaced in it with nitrogen was introduced 100 ml of dehydrated and deoxygenated n-heptane, and then 5 g of the solid component (A) as produced in the paragraph (a) above, and 5 g of amply purified 1-hexene were introduced. The reaction was conducted at 30° C. for two hours thereby to produce the solid component (B). The particle size of the particles of the component (B) was found to be 2.6 microns upon determiniation by the sedimentation method.

(c) Production of a propylene copolymer

According to the process disclosed in Japanese Patent Publication No. 33721/1986, copolymerization of propylene was carried out wherein a horizontal biaxial gas phase polymerization vessel of 13-liter volume was used.

After replacement of the polymerization vessel in it with thoroughly purified nitrogen, 400 g of an amply dehydrated and deoxygenated polymer carrier was added. Subsequently, 500 mg of triethylaluminum and 90 mg and 10 mg of the above prepared components (A) and (B), respectively, were introduced. The first polymerization step was conducted so that after introduction of 1000 ml of hydrogen, at a temperature controlled to 75° C., propylene was introduced at a constant rate of 1.3 g/min. The stirring rotation of the polymerization vessel was 350 r.p.m. The polymerization temperature was maintained at 75° C. and, after 3 hours and 10 minutes, introduction of propylene was stopped. Polymerization was continued at 75° C., and when the polymerization pressure became 1 kg/cm$^2$G, a small amount of the polymer was sampled.

Then, 500 ml of $H_2$ was added to initiate the second polymerization step. The second stage polymerization was carried out by introducing 0.59 g/min. of propylene and 0.40 g/min. of ethylene respectively at constant rates at 70° C. for 2 hour and 15 minutes. Introduction of propylene and ethylene was stopped, and polymerization under the residual pressure was carried out until the polymerization pressure became 1 kg/cm$^2$G. After completion of polymerization, the polymer was taken out after purging the process product to give 387 g of a polymer. The polymer formed had an MFR of 8.8 g/10 min., a polymer bulk density (B.D.) of 0.41 g/cc, and a polymer falling speed of 5.7 sec. The weight of the elastomeric copolymer was 33.4% by weight.

There was no polymer adherence in the polymerization vessel at all, and the intermediate sample had an MFR or 18.2 g/10 min.

The "polymer falling speed" means the time required for falling of 50 g of the polymer out of an outlet of 2.5 cm$^2$ of a vessel. The weight of the elastomeric copolymer is a weight of a xylene soluble matter at 20° C.

EXAMPLE 2

The procedure set forth in Example 1 was followed except for the quantity of the component (A) and the type of the component (B) changed respectively, to 95 mg and to that of an average particle size of 1.4 microns prepared through preliminary polymerization thereon of 7.5 g of 1-hexene.

388 g of a polymer was obtained. The polymer had an MFR of 8.9 g/10 min., the content of an elastomeric polymer was 33.1% by weight, the polymer B.D. was 0.41 g/cc and the polymer falling speed was 5.8 seconds. No adherence of a polymer in the vessel was found.

EXAMPLE 3

The procedure set forth in Example 1 was followed except for quantity of the component (A) and the type and quantity of the component (B) changed, respectively, to 85 mg and to 15 mg of that of an average particle size of 4.8 microns prepared through preliminary polymerization thereon of 6.77 g of 1-decene.

382 g of a polymer was obtained. The polymer had an MFR of 8.6 g/10 min., the polymer B. D was 0.40 g/cc and the polymer faling speed was 5.9 seconds.

The content of an elastomeric polymer was 33.9% by weight, and there was no adherence of a polymer in the polymerization vessel.

REFERENCE EXAMPLE 1

The procedure set forth in Example 1 was followed except for the quantity of the component (A) changed to 100 mg and no use of the component (B). A polymer in a quantity of 381 g was obtained. The polymer MFR was 8.7 g/10 min., the polymer B.D. was 0.26 g/cc, the polymer falling speed was not measurable (no falling), and there was a lot of adherence of a polymer in the polymerization vessel.

REFERENCE EXAMPLE 2

The procedure set forth in Example 3 was followed except for the type of the component (B) changed to that of an average particle size of 12.6 microns prepared through preliminary polymerization thereon of 5 g of propylene.

382 g of a polymer was obtained. The polymer had an MFR of 8.8 g/10 min, the polymer B.D. was 0.28 g/cc, the polymer falling speed was not measurable (no falling), and there was a lot of adherence of a polymer in the polymerization vessel.

We claim:

1. A process for producing granular propylene copolymers which comprises: a first polymerization step wherein propylene as such or in admixture with ethylene is subjected to polymerization in one or more steps in the substantial absence of an inert solvent in the presence of a Ziegler-Natta type catalyst comprising a solid transition metal catalyst component and an organometal component thereby producing a granular propylene homopolymer or copolymer with ethylene of an ethylene content of no higher than 7% by weight; and a second polymerization step wherein ethylene as such or in admixture with propylene is subjected to polymerization, in the presence of a product of the first polymerization step, in one or more steps in the substantial absence of an inert solvent thereby producing an elastomeric polymer of ethylene, wherein the quantity of a polymer produced in the second polymerization step comprises 10 to 50% by weight of the final propylene copolymer produced, the solid transition metal component being a mixture of component (A) which is a solid catalyst component comprising titanium, magnesium and a halogen as essential elements and having granulometric characteristics such that the average particle size is 10 to 50 microns and a content of particles of a maximum dimension of no larger than 5 microns is no higher than 0.1% by weight; and component (B) which is a solid catalyst component comprising titanium, magnesium and a halogen as essential elements and having granulometric characteristics such that its average particle size is within the range of 1 to 5 microns and the quantity of particles of a maximum dimension of 5 microns or smaller is 60 to 95% by weight, the quantity of the component (B) being 0.1 to 20% by weight of the component (A).

2. The process as claimed in claim 1 wherein the component (A) has a content of particles of the maximum size of 5 microns or smaller of 0.01% by weight or lower.

3. The process as claimed in claim 1 wherein particles of the component (A) have undergone preliminary polymerization of an α-olefin thereon, which α-olefin will produce a crystalline polymer.

4. The process as claimed in claim 3 wherein the α-olefin is selected from the group of ethylene, propylene and 4-methyl-pentene-1.

5. The process as claimed in claim 1 wherein the component (B) is produced from the component (A) by crushing the particles of the component (A) followed if necessary by sieving of the crushed product.

6. The process as claimed in claim 1 wherein the component (B) is produced from the component (A) by subjecting particles of the component (A) to preliminary polymerization thereon of an u-olefin which will produce a non-crystalline or amorphous polymer, followed if necessary by sieving of the preliminary polymerization product.

7. The process as claimed in claim 6 wherein the α-olefin is selected from the group of an monoolefin of 4 to 10 carbon atoms and a diolefin of 4 to carbon atoms.

8. The process as claimed in claim 1 wherein the component (A) is a solid catalyst component prepared without having undergone preliminary polymerization and processed so that the content of the particles of the maximum size of 5 microns or smaller is 0.1% by weight or lower and the component (B) is prepared from the particles for the component (A) by subjecting the particles for the component (A) to preliminary polymerization thereon of an u-olefin selected from the group of mono- and di- olefins of 4 to 10 carbon atoms.

9. The process as claimed in claim 1 wherein the polymer produced in the first polymerization step is a homopolymer of propylene.

10. The process as claimed in claim 1 wherein the polymer produced in the first polymerization step is a propylene copolymer with ethylene of an ethylene content of no higher than 2% by weight.

11. The process as claimed in claim 1 wherein the polymer produced in the second polymerization step is an ethylene homopolymer.

12. The process as claimed in claim 1 wherein the polymer produced in the second polymerization step is an ethylene copolymer with propylene of an ethylene content of from 20 and less than 100% by weight.

13. The process as claimed in claim 3 wherein the polymer produced in the second polymerization step is an ethylene copolymer with propylene of an ethylene content of from 30 and less than 100% by weight.

14. The process as claimed in claim 1 wherein the polymer produced in the second polymerization step is an ethylene copolymer with propylene of an ethylene content of 75 to 95by weight.

15. The process as claimed in claim 1 wherein the quantity of the component (B) is 1 to 10% by weight of the component (A).

16. The process as claimed in claim 1 wherein the first and the second polymerization steps are conducted by means of gas phase polymerization.

17. A process for producing granular propylene copolymers, which comprises:

in a first polymerization step, polymerizing propylene as such or in admixture with ethylene in one or more steps in the substantial absence of an inert solvent in the presence of a Zielger-Natta catalyst comprising a solid transition metal catalyst component and an organometal component, thereby producing a granular propylene homopolymer or copolymer with ethylene having an ethylene content of no higher than 7% by weight; and in a second polymerization step, polymerizing ethylene as such or in admixture with propylene in the presence of the product of the first polymerization step, in one or more steps in the substantial absence of an inert solvent, thereby producing an elastomeric polymer of ethylene, wherein the quantity of a polymer produced in the second polymerization step comprises 10 to 50% by weight of the final propylene copolymer produced, the solid transition metal components of the catalyst being a mixture of:

component (A) which is a solid catalyst component comprising titanium, magnesium and a halogen as essential elements and having granulometric characteristics such that the average particle size is 10 to 50 microns and the content of particles of a maximum dimension of no larger than 5 microns is no greater than 0.1% by weight; and component (B), which is a solid catalyst component comprising titanium, magnesium and a halogen as essential elements and having granulometric characteristics such that its average particle size is within the range of 1 to 5 microns and the quantity of particles of a maximum dimension of 5 microns or smaller to 60 to 95% by weight, component (B) being selected from the group consisting of a product produced from component (A) by crushing the particles of component (A) followed by an optional step of sieving the crushed product and a product produced from component (A) by subjecting particles of component (A) to preliminary polymerization thereon of an α-olefin which produces a non-crystalline or amorphous polymer, followed by an optional step of sieving the preliminary polymerization product, the quantity of component (B) ranging from 0.1 to 20% by weight of component (A).

18. The process as claimed in claim 17, wherein component (A) has a content of particles of a maximum size of 5 microns or smaller in an amount of 0.01% by weight or less.

19. The process of claim 17, wherein the amount of component (B) ranges from 1 to 10% by weight of component (A).

* * * * *